(12) United States Patent
Kubik et al.

(10) Patent No.: US 6,324,651 B2
(45) Date of Patent: *Nov. 27, 2001

(54) METHOD AND APPARATUS FOR SAVING DEVICE STATE WHILE A COMPUTER SYSTEM IS IN SLEEP MODE

(75) Inventors: Joseph Kubik, Austin; Mark Daniel Rogalski, Leander; Joel L. Smith, Round Rock, all of TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/190,561

(22) Filed: Nov. 12, 1998

(51) Int. Cl.$^7$ ........................................ G06F 1/26
(52) U.S. Cl. ............................................. 713/323
(58) Field of Search .................... 713/323, 300, 713/320, 321, 322, 324, 330

(56) References Cited

U.S. PATENT DOCUMENTS

| | | | |
|---|---|---|---|
| 4,698,748 | 10/1987 | Juzswik et al. | 364/200 |
| 5,218,704 | 6/1993 | Watts, Jr. et al. | 395/750 |
| 5,262,998 | 11/1993 | Mnich et al. | 365/222 |
| 5,497,494 | * 3/1996 | Combs et al. | 713/323 |
| 5,603,038 | * 2/1997 | Crump et al. | 713/310 |
| 5,764,999 | * 6/1998 | Wilcox | 713/300 |
| 5,832,283 | * 11/1998 | Chou et al. | 713/300 |
| 5,974,428 | * 10/1999 | Gerard et al. | 707/203 |

FOREIGN PATENT DOCUMENTS

04296954 A * 10/1992 (JP) .

* cited by examiner

Primary Examiner—Robert Beausoleil
Assistant Examiner—X. Chung-Trans
(74) Attorney, Agent, or Firm—David A. Mims, Jr.; Bracewell & Patterson, L.L.P.

(57) ABSTRACT

A serializable object, formed by a device driver and containing characteristics (device state) of the device, is held by a device driver and made known to a data processing system's power manager. The power manager provides a device driver independent mechanism for saving device state by retrieving each device driver's object containing device state and storing the object in a location that provides for efficient and quick retrieval. The power manager, being aware of power levels for all devices on the system, may determine where, how and when to store objects retrieved from the device drivers for most efficient retrieval. Upon receiving an interrupt indicating the system should power up, the serializable objects are retrieved by the power manager and restored to each device driver.

18 Claims, 6 Drawing Sheets

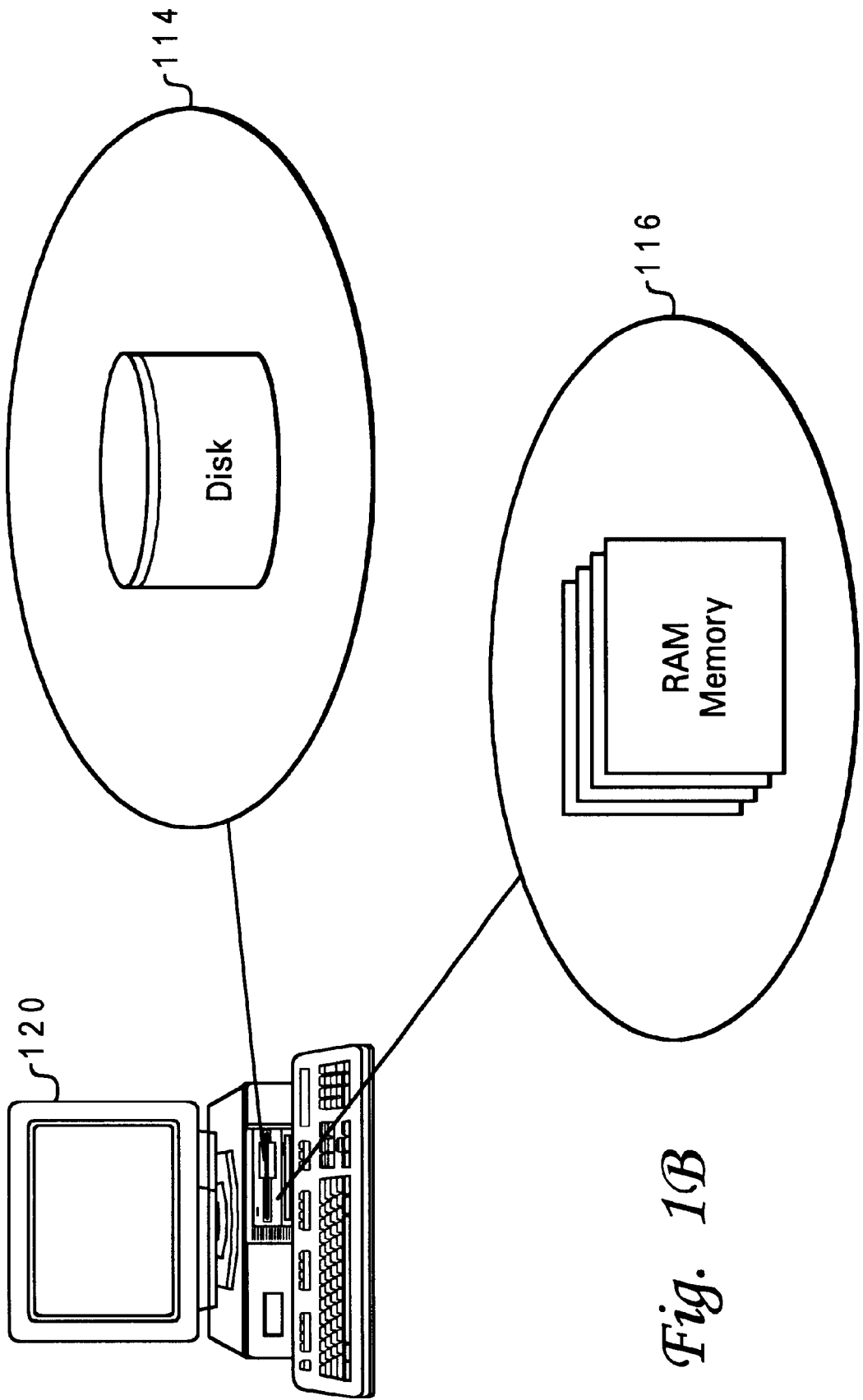

METHOD AND APPARATUS FOR SAVING DEVICE STATE WHILE A COMPUTER SYSTEM IS IN SLEEP MODE

BACKGROUND OF THE INVENTION

1. Technical Field

The present invention relates in general to power management and in particular to restoring prior device states in a data processing system after a reduced power mode. More particularly, the present invention relates to reducing restoration time of device states for devices that have been in sleep mode.

2. Description of the Related Art

Modern computer hardware, particularly mobile computers such as laptops and notebooks, support multiple power levels. One such level, often referred to as "sleep mode," removes power from selected, nonessential devices after a predetermined period of inactivity. Facilities are generally provided to "wake" the data processing system by restoration of power to the selected devices to resume normal operation. This power level is particularly advantageous in data processing systems having finite available power, such as those operating on a battery.

Power management is the process of controlling the electric power consumption of data processing systems by selectively cutting off power to various parts of the system, thereby disabling those devices. A device driver which is able to prepare for and recover from the loss and restoration of power is said to be "power management aware." Ideally, a power management aware device driver should minimize the user's perceived disruption of computer services during a power management cycle. Thus, the state of the adapter, device drivers, and applications after the restoration of power should be as close to the pre-shutdown state as possible. However, not all devices within a data processing system are power management aware. Some devices must be re-initialized on power restoration.

When power is removed from a device, the contents of any internal registers and volatile memory is generally lost. For example, a display adapter will lose the contents of any internal display cache, which may include information regarding user selections for resolution, color depth, etc. When power is restored, the display adapter device driver must re-initialize the internal registers and memory, usually by making numerous time consuming calls to the operating system to retrieve initialization data. Additionally, nonpersistent data, which is not normally stored in a nonvolatile memory but is merely generated as a result of user activity, must be saved before power down and then retrieved on power restoration. Thus, restoration of power to the device and returning to a previous wake state may be a slow and somewhat difficult process.

In FIG. 4, a high-level flow diagram of a known process for restoring device states within a data processing system after the data processing system returns from sleep mode, is depicted. The process begins with step 400, which depicts a computer beginning a state of user input activity. The process continues with step 402, which illustrates a determination of the time passed with no activity. The process passes to step 404, which depicts a determination of whether or not the period of time set for beginning of sleep mode has been reached. If not the process returns to step 402 and continues to check for a pre-defined period of inactivity. If the period signaling sleep mode has been reached, the process instead proceeds to step 406, which illustrates a device driver determining the characteristics of its device state that must be saved in order to power-up properly. Since device drivers are generally not aware of hard disk drives or other nonvolatile memory in the system, most device drivers can only save to the system's random access memory (RAM). Characteristics are stored, typically to RAM, at the discretion of the device driver for later retrieval when restoration from sleep mode commences.

The process then proceeds to step 408, which illustrates the device driver saving the state of the device to the location in RAM designated by that individual device. It is possible, but not common, that devices within the computer may save device state to any storage medium with in the data processing system. If device states are stored on separate storage sites individual device state retrieval varies with the response time of the storage medium (disk, ram, flashcard, etc.). If stored on RAM, the retrieval time may be short but, if stored on disk, retrieval time may be relatively long.

The process next proceeds to step 410, which depicts powering down a device after device state has been stored. The process next passes to step 412, which depicts a determination of whether there are more device drivers with requirements to store device states into save locations. If there are more device states to be saved, the process returns to step 406 and repeats the cycle until all device states have been stored. If there are no more device drivers with storage requirements the process passes to step 414, which depicts the computer in sleep mode, awaiting an interrupt that would signal the end of sleep mode.

The problem of restoring power and returning to a previous wake state has been handled in laptop computers by providing device driver specific implementations of state saving. Often, the machine's entire state is saved to a hard drive. The state would be persistently stored but there are disadvantages to this solution. Saving large amounts of memory can be time consuming and restoration time may be nearly the same length as booting the system. In a laptop, the slow restoration time may be tolerated but for network machines without a hard drive, sending and retrieving its entire state across a network connection is time consuming and not desirable.

It would be desirable, therefore, to provide a method and apparatus for saving device state in a persistent condition. It would further be desirable to restore the device state quickly when power is re-applied from a reduced power mode.

SUMMARY OF THE INVENTION

It is therefore one object of the present invention to provide a method and system for power control.

It is another object of the present invention to provide a method and system for restoring prior device states in a data processing system after a reduced power mode.

It is yet another object of the present invention to provide a method and apparatus for reducing restoration time of device states for devices that have been in a reduced power mode (sleep mode) without making calls to the operating system to retrieve initialization data.

The foregoing objects are achieved as is now described. A serializable object, formed by a device driver and containing characteristics (device state) of the device, is held by a device driver and made known to a data processing system's power manager. The power manager provides a device driver independent mechanism for saving device state by retrieving each device driver's object containing device state and storing the object in a location that provides for efficient and quick retrieval. The power manager, being aware of power levels for all devices on the system, may determine where, how and when to store objects retrieved from the device drivers for most efficient retrieval. In other words, the power manager chooses the most efficient location. Upon receiving an interrupt indicating the system should power up, the serializable objects are retrieved by the power manager and restored to each device driver.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 1A and 1B are high-level block diagrams of target storage mediums in accordance with a preferred embodiment of the present invention;

DETAILED DESCRIPTION OF THE PREFERRED EMBODIMENT

Figure 1:
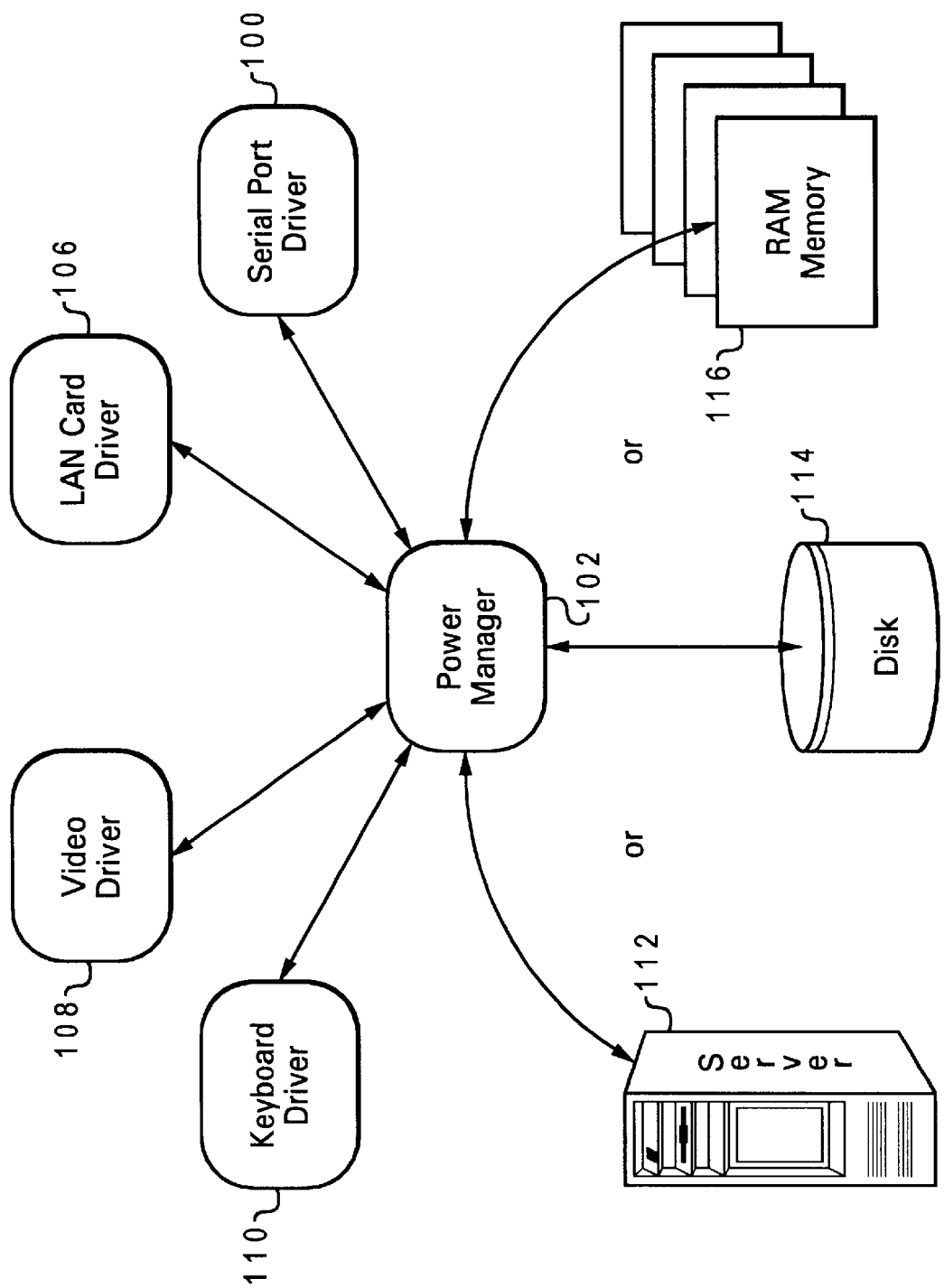
FIG. 1 depicts a high-level block diagram of a power manager within a data processing system in which a preferred embodiment of the present invention may be implemented.

With reference now to the figures, and in particular with reference to FIG. 1, a high-level block diagram of a power manager within a data processing system in which a preferred embodiment of the present invention may be implemented is depicted. Power manager 102, is the logical single component to determine the optimum location to store device states. Currently, device drivers store the state of the individual device, usually in RAM memory. Power manager 102 also has the capability to store device states. An individual device state may comprise register contents, memory state, etc. and may occupy a large amount of memory space. Normally, a device driver may save device state to RAM when entering sleep mode. However, power manager 102 is aware of the status of the system state and is better able to determine where the device state should be stored for most efficient power restoration.

Serial port driver 104, LAN card driver 106, video driver 108 and keyboard driver 110 all represent drivers that supply the appropriate characteristics to power manager 102 for proper storage prior to shut down. The double headed lines indicate that power manager 102 also returns the individual characteristics to the proper devices prior to restoration. As indicated, power manager 102 directs storage of device states to a storage medium—server 112 (in the case of a network connected data processing system), disk drive 114 or RAM memory 116—that best fits the need of the system during startup. A device's characteristics (device state) are written to a serializable object and generally, most devices would only require one to two kilobytes of memory to retain the necessary characteristics for restoration. Power manager 102 does not pick the characteristics for each device state because individual device drivers provide the device characteristics, as is presently done. Code for the individual device driver is such that the driver will write the device state to a serializable object and make the object available to the power manager. Only those characteristics determined by the device driver necessary for proper restoration to the device state existing at shutdown are written to the object. Power Manager 102 stores the objects in a storage medium, or location, best suited for most efficient restoration.

Figure 1A:
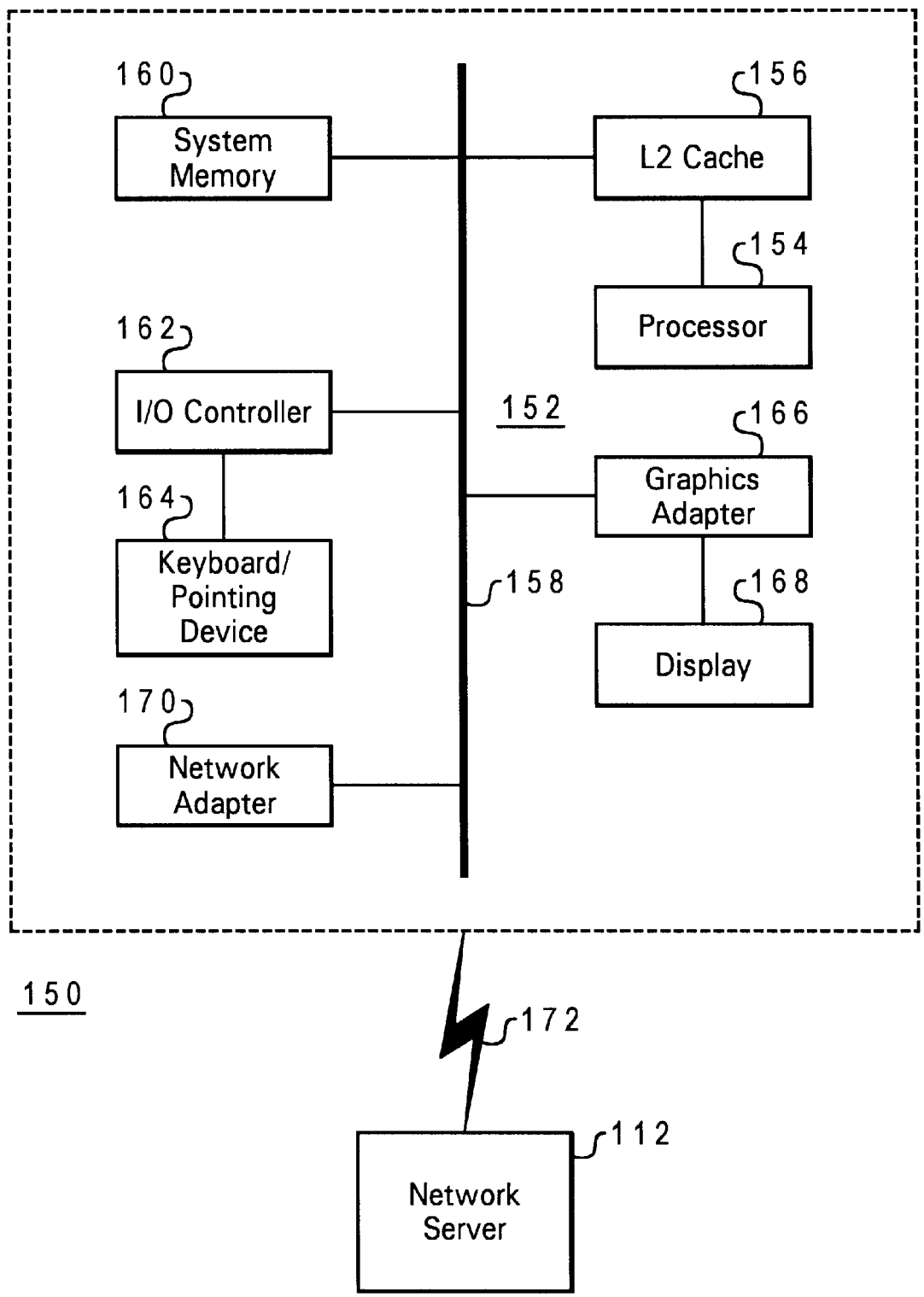

Referring to FIGS. 1A and 1B, high-level block diagrams of target storage mediums in accordance with a preferred embodiment of the present invention is illustrated. FIG. 1A illustrates a block diagram of a data processing system embodiment of the present invention. Data processing system network 150 includes network data processing system 152. Data processing system 152, in turn, includes a processor 154 connected, in the exemplary embodiment, to a level two (L2) cache 156, which is connected in turn to a system bus 158.

Also connected to system bus 158 is system memory 160 and input/output (I/O) controller 162. I/O controller 162 couples input devices such as a keyboard and/or pointing device (conventional mouse, trackball, trackpoint, etc.) 164 to system bus 156. In a preferred embodiment, data processing system 152 also includes graphics adapter 116 connected to system bus 158, receiving display data for monitor or display 168. Data processing system 152 further includes a network adapter 170 for connecting data processing system 152 to a network.

Data processing system 152 is coupled via communications link 172, such as an Ethernet protocol network, to network server 112. Data processing system 152 need not include local, nonvolatile storage, but may instead include within a power-on self-test (POST) routine stored within a read-only memory (ROM) (not shown) instructions allowing processor 154 to initialize network adapter 170 and transmit a request from data processing system 152 to network server 124 over communications link 172. Network server 162 may then respond to that request by transferring operating system modules and application executables to data processing system 152 to be loaded into system memory 160. Network data processing system 152 is thus essentially booted over the network and may contain no local data storage other than system memory 160.

The exemplary embodiment shown in FIG. 1A is provided solely for the purposes of explaining the invention and those skilled in the art will recognize that numerous variations of the components depicted in FIG. 1A and described above are possible, both in form and function, and also that the present invention may be employed with equal benefit in other types of data processing systems. Such variations in which the present invention may be implemented are considered to be within the spirit and scope of the present invention.

FIG. 1B, illustrates a block diagram of a Personal Computer ("PC") embodiment of the present invention. A power manager (not shown) within PC 120, may load device state characteristics in the form of serializable objects, to either RAM memory 116, disk drive 114 or flashcard (not shown). An object contains only characteristics necessary to resume operation of devices in the state they were left at power down. The power manager stores objects, comprising individual device characteristics, to a location that will best fit system requirements on restoration. The location is determined by the power manager so that time required for retrieving and reloading the individual objects is optimal for the most efficient system restoration. Additional factors taken into account may include power savings, backup/reliability, availability of hardware, administrator (user) choice, etc.

Figure 2:
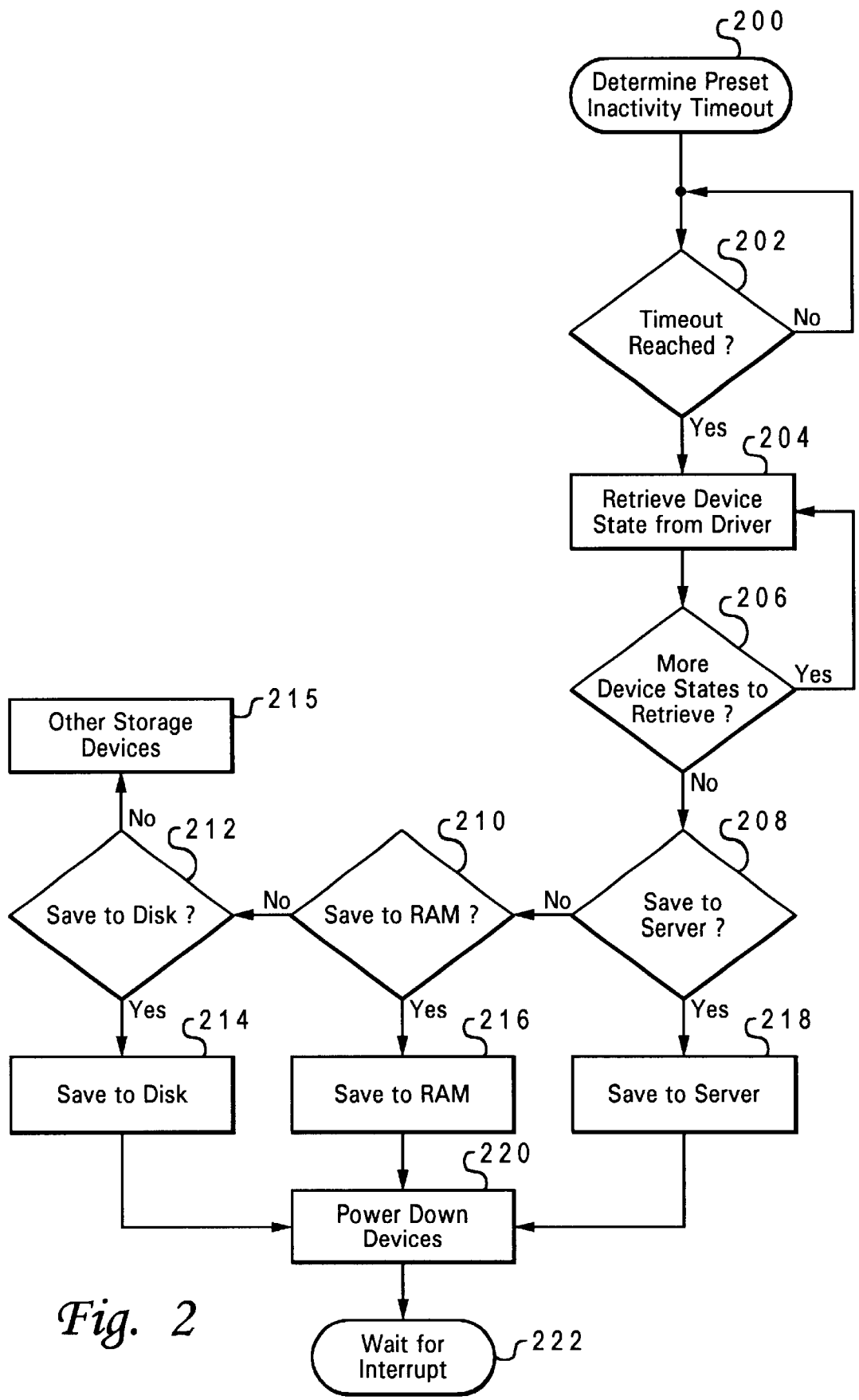
FIG. 2 depicts a high-level flow diagram of a power-down sequence of a process for reducing device state restoration time when a computer is in sleep mode in accordance with a preferred embodiment of the present invention.

Referring now to FIG. 2, a high-level flow diagram of a power-down sequence of a process for reducing device state restoration time when a computer is in sleep mode in accordance with a preferred embodiment of the present invention is depicted. Logic code governing operation of the power manager requires the power manager to store serializable objects, containing device characteristics, that the power manager retrieved from a device driver prior to shutting down the device. The power manager considers the state of the whole data processing system and stores the object so that it is retrievable in an ordered manner (serial retrieval), determined by the power manager, that will provide the fastest and most efficient restoration of system state from sleep mode.

The process begins with step 200, which depicts a determination of the time period of inactivity that the power manager is to measure. The process proceeds to step 204, which illustrates a determination of whether there has been any user input activity within the set time period. If activity has occurred, the procedure returns to step 200. If there is no activity, the process instead proceeds to step 204, which depicts the power manager retrieving device state, in the form of an object, from a device driver. The process next passes to step 206, which illustrates a determination of whether there are more devices that need to store characteristics of their device state. If there are, the process returns to step 204 until all device states have been retrieved.

The process next proceeds to step 208, which depicts a determination of where the device state is to be saved. As discussed above, the power manager determines the optimum storage location for the device state so that restoration is accomplished in an efficient and timely manner. In this embodiment, the data processing system may be a Personal Computer ("PC") connected to a network server. If the power manager determines the device state is to be saved to the server, the process proceeds to step 218, which illustrates saving device states (objects) to the server.

In the case of a PC, the determination may be made not to store a device state to the server, in which case the process proceeds from step 208 to step 210, which depicts the power manager determining whether to save the device state to RAM memory within the PC. If so, the process then passes to step 216, which illustrates saving the device state to RAM memory. If not, the process instead passes to step 212, which depicts a determination of whether to save the device state to disk. If not, the process next passes to step 215, which depicts the power manager sending the device state to another storage device within the PC. If the power manager determines the device state should be saved to disk, the process instead passes to step 216, which illustrates saving the device state to disk.

In all cases of storage, after the device state is stored on disk 214, in RAM memory 216, on a server 218 or any other power manager designated device, the process continues to step 220, which depicts the power manager powering down all devices with the saved states. The process then proceeds to step 222, which illustrates the power manager waiting for an interrupt that would signal the power up process.

Figure 3:
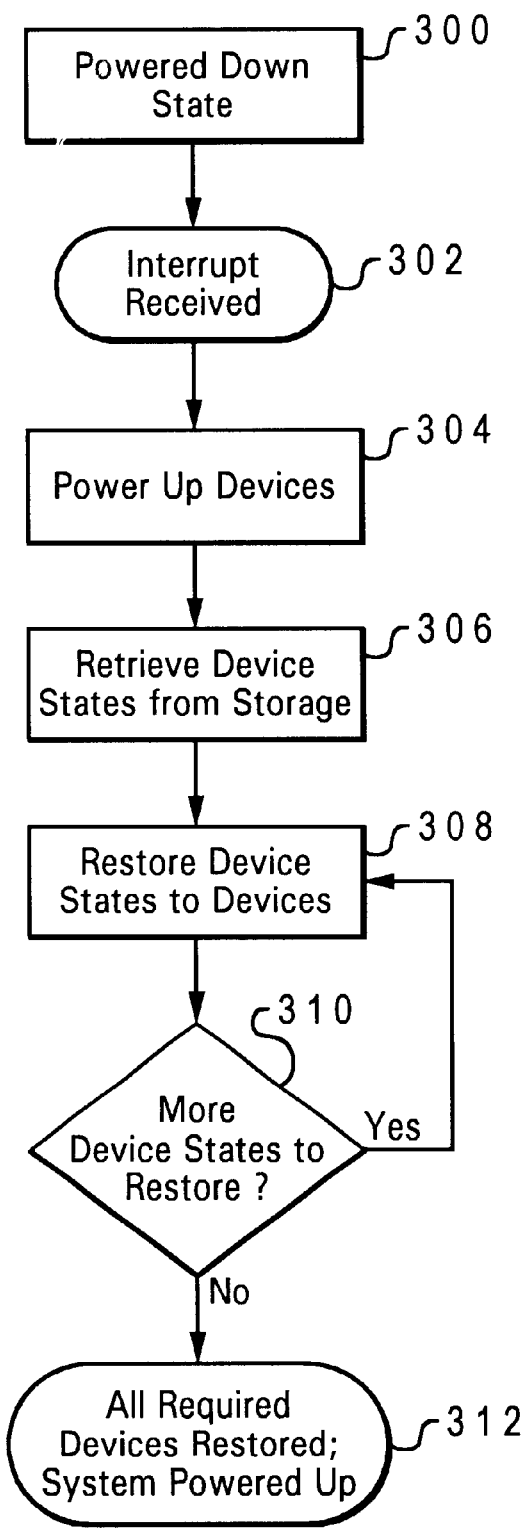
FIG. 3 is a high-level flow diagram of a power-up sequence of a process for reducing device state restoration time when a computer is in sleep mode in accordance with a preferred embodiment of the present invention.
Figure 4:
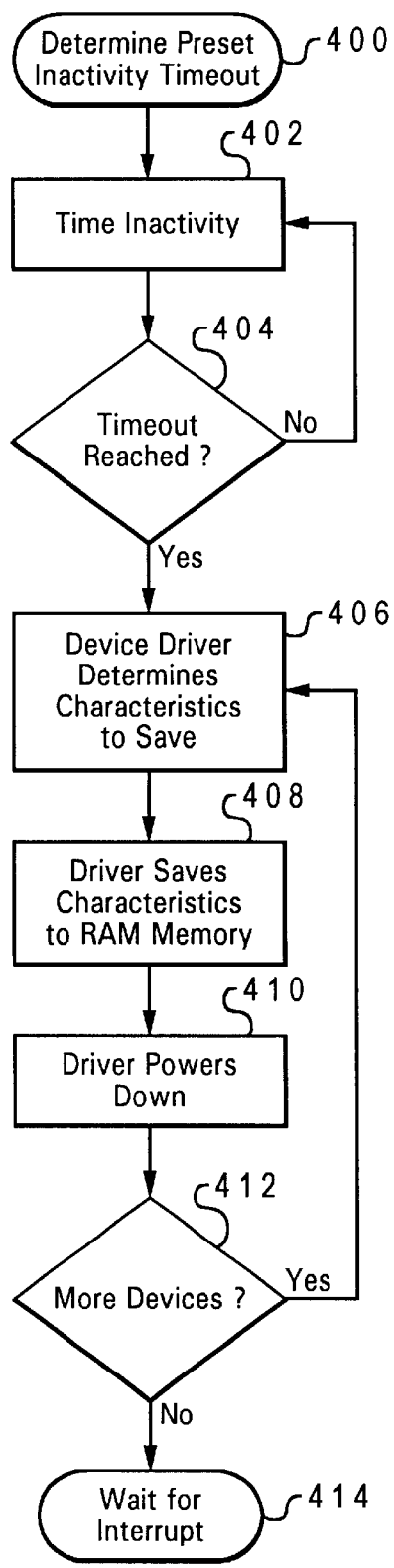
FIG. 4 depicts a high-level flow diagram of a known process for restoring device states within a computer when a computer is in sleep mode.

Referring to FIG. 3, a high-level flow diagram of a power-up sequence of a process for reducing device state restoration time when a computer is in sleep mode in accordance with a preferred embodiment of the present invention, is illustrated. The process begins with step 300, which depicts the computer (terminal, in a network) in a powered down state. The process proceeds to step 302, which illustrates an interrupt being sensed by the power manager. The process next passes to step 304, which depicts the power manager starting the procedure to power up the system devices. The process continues to step 306, which illustrates the power manager retrieving device state characteristics (stored objects) from the storage location.

The process proceeds next to step 308, which depicts the power manager restoring stored device states to the proper devices. The process then passes to step 310, which illustrates a determination of whether there are more device state to restore. If there are more device states to restore, the process returns to step 308. If not, the process proceeds instead to step 312, which depicts the data processing system restored to the former state from sleep mode.

In the prior art, device drivers saved individual device characteristics, generally, to locations in RAM memory prior to entering sleep mode. This allows for quick startup, but requires all of RAM to be saved. Saving all of RAM to a network server may be objectionable due to the long retrieval time over a network connection. Keeping all RAM powered may consume more power than desired.

The present invention saves time and power. Upon determination that a data processing system is entering sleep mode, a device driver determines the necessary characteristics the driver will need to return the device's current state. The driver, utilizing logic code provided by the invention, writes the characteristics to a serializable object and makes the object available for retrieval by the power manager. At entry into sleep mode, the power manager retrieves objects from the device drivers and serializes them to a specific location that may include persistent storage (disk drive) or volatile memory (including RAM, flash card, local low powered memory, etc.).

The power manager is aware of power levels for all devices and is best able to determine where, how and when to store the serializable objects to save power and minimize restoration time for the processing system. When sleep mode is ended, the power manager retrieves the stored objects and loads the objects to the proper devices. Other considerations that may be included in determining a save location are availability of hardware (limited RAM memory, no disk), power savings, network usage, reliability, administrator preference and so on.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for saving a state of a device during sleep mode, comprising:

utilizing a data processing system power manager to manage storage and retrieval of specific characteristics of the state of a device;

saving specific characteristics from a driver for the device as a serializable object;

determining a storage location for the serializable object based on predetermined parameters;

storing the serializable object in the storage location upon entering a sleep mode; and restoring the specific characteristics to the device, utilizing the serializable object upon detecting an interrupt signaling departure from the sleep mode.

2. The method of claim 1, wherein the step of determining a storage location for the serializable object based on predetermined parameters further comprises:

saving the serializable object to a location that will provide a fastest restoration time for the specific characteristics to the device upon departure from the sleep mode.

3. The method of claim 1, wherein the step of determining a storage location for the serializable object based on predetermined parameters further comprises:

saving the serializable object to a location that affords a best power savings for storage and retrieval of the object.

4. The method of claim 1, wherein the step of determining a storage location for the serializable object based on predetermined parameters further comprises:

saving the serializable object to a location determined by a capacity and availability of a potential storage location.

5. The method of claim 1, wherein the step of determining a storage location for the object based on predetermined parameters further comprises:

saving the serializable object to a location that is determined by a data processing system operator.

6. The method of claim 1, wherein the step of utilizing a data processing system power manager to manage storage and retrieval of specific characteristics of the state of a device further comprises:

utilizing driver logic to select the specific characteristics; and determining a minimum number of driver characteristics that will completely restore the state of the device.

7. An apparatus for storing and retrieving device state characteristics from a device driver, comprising:

a data processing system;

a power manager in communication with the data processing system and including logic to store serializable objects and to manage retrieval and storage of specific characteristics of a state of a device;

logic within the power manager for saving the specific characteristics of the state of the device as a serializable object;

a storage location accessible to the data processing system and selected based on predetermined parameters at which the serializable object is saved;

logic within the power manager for saving the serializable object in the storage location upon entering a sleep mode; and logic within the power manager for restoring the specific characteristics from the serializable object to the device upon detecting an interrupt signaling departure from the sleep mode.

8. The apparatus of claim 7, wherein a device driver for the device determines the specific characteristics of the state of the device which are saved within the serializable object.

9. The apparatus of claim 7, wherein the data processing system further comprises:

a network of computers with a server; and a storage area on the server for saving the serializable object.

10. The apparatus of claim 7, wherein the storage location at which the serializable object is saved further comprises:

a random access memory for storage and retrieval of the serializable object.

11. The apparatus of claim 7, wherein the storage location at which the serializable object is saved further comprises:

a flash card memory.

12. The method of claim 7, wherein the storage location at which the serializable object is saved further comprises:

a storage location determined by a data processing system operator.

13. A computer program product within a computer readable medium for saving a state of a device during sleep mode, comprising:

instructions within the computer readable medium for utilizing a data processing system power manager to manage storage and retrieval of specific characteristics of a state of a device;

instructions within the computer readable medium for saving the specific characteristics from a driver for the device as a serializable object;

instructions within the computer readable medium for determining a storage location for the serializable object based on predetermined parameters;

instructions within the computer readable medium for saving the serializable object in the storage location upon entering a sleep mode; and instructions within the computer readable medium for restoring the specific characteristics to the device from the serializable object upon detecting an interrupt signaling departure from the sleep mode.

14. The computer program product of claim 13, wherein the instructions for determining a storage location for the serializable object based on predetermined parameters further comprise:

instructions within the computer readable medium for saving the serializable object to a location that will provide a fastest restoration time.

15. The computer program product of claim 13, wherein the instructions for determining a storage location for the serializable object based on predetermined parameters further comprise:

instructions within the computer readable medium for saving the serializable object to a location affording a greatest power savings for storage and retrieval of the serializable object.

16. The computer program product of claim 13, wherein the instructions for determining a storage location for the serializable object based on predetermined parameters further comprise:

instructions within the computer readable medium for saving the serializable object to a location determined by a capacity and availability of a potential storage location.

17. The computer program product of claim 13, wherein the instructions for determining a storage location for the serializable object based on predetermined parameters further comprise:

instructions within the computer readable medium for saving the serializable object to a location that is determined by a data processing system operator.

18. The computer program product of claim 13, wherein the instructions for utilizing a data processing system power manager to manage storage and retrieval of specific characteristics of a state of a device further comprise:

instructions within the computer readable medium for utilizing device driver logic to select the specific characteristics; and instructions within the computer readable medium for determining a minimum number of driver characteristics that will completely restore the device state.

* * * * *